United States Patent [19]

Durand et al.

[11] 3,751,641

[45] Aug. 7, 1973

[54] APPARATUS FOR READING WHILE SUPPORTING INFORMATION MEANS

[75] Inventors: Pierre Durand, Fresnes; Gerard Lartique, Fontenay-aux-Roses, both of France

[73] Assignee: Hoffman-La Roche Inc., Nutley, N.J.

[22] Filed: Dec. 29, 1971

[21] Appl. No.: 213,656

[52] U.S. Cl. .......... 235/66.11 C, 200/46

[51] Int. Cl. .......... G06k 7/04, H01h 43/08

[58] Field of Search .......... 235/61.11 C, 61.11 R; 200/46

[56] References Cited

UNITED STATES PATENTS

| | | | |
|---|---|---|---|
| 3,553,436 | 1/1971 | Webb et al. | 235/61.11 C |
| 2,980,319 | 4/1961 | Clemens et al. | 235/61.11 C |
| 3,294,957 | 12/1966 | Young | 234/61.11 C |
| 3,515,339 | 6/1970 | McEwan | 234/61.11 C |
| 3,534,397 | 10/1970 | McWade | 235/61.11 C |
| 3,614,395 | 10/1971 | Harshman | 235/61.11 C |

*Primary Examiner*—Daryl W. Cook
*Attorney*—Samuel L. Welt, Bernard S. Leon et al.

[57] ABSTRACT

The present invention relates to a novel apparatus for the facile reading of information on an information carrying means such as perforated card and the like.

12 Claims, 5 Drawing Figures

Patented Aug. 7, 1973 3,751,641

3 Sheets-Sheet 1

APPARATUS FOR READING WHILE SUPPORTING INFORMATION MEANS

DETAILED DESCRIPTION OF THE INVENTION

The present invention has for its object the provision of an apparatus which can read information contained on an information carrying means such as a perforated card and the like, which apparatus can perform its functions with a high degree of reliability.

It is a further object of the present invention to furnish an apparatus for reading information contained on an information carrying means which is capable of being operatively connected, in a facile and simple manner, to a device which analyzes the information read, such as a calculator or a logic device, so that subsequent treatment of said information yields useful data.

More particularly, it is an object of the present invention to provide an apparatus which will positively identify a particular receptacle in which there is disposed a sample taken from a human subject such as blood or a sample of another organic liquid, which sample is to be subjected to chemical or biochemical analysis.

The device in accordance with the invention is characterised in that it comprises a casing member articulately mounted on a base member, a plurality of contact members movably mounted on the casing member, one end of each of said contact members extending from the casing member and being so sized as to permit the entry thereof into perforations formable on an information carrying means at perforatable sites, said contact members being disposed on the casing member in a pattern corresponding to the pattern of the perforatable sites on the information carrying means, said contact members each including a contact portion at a site remote from said one end; a circuit board fixedly secured to the casing member, each of said contact portions being the movable portion of an interruptor, the fixed contact of which being carried by the printed circuit board.

The invention will be well understood by the description which follows and by reference to the attached drawing in which.

Figure 1:
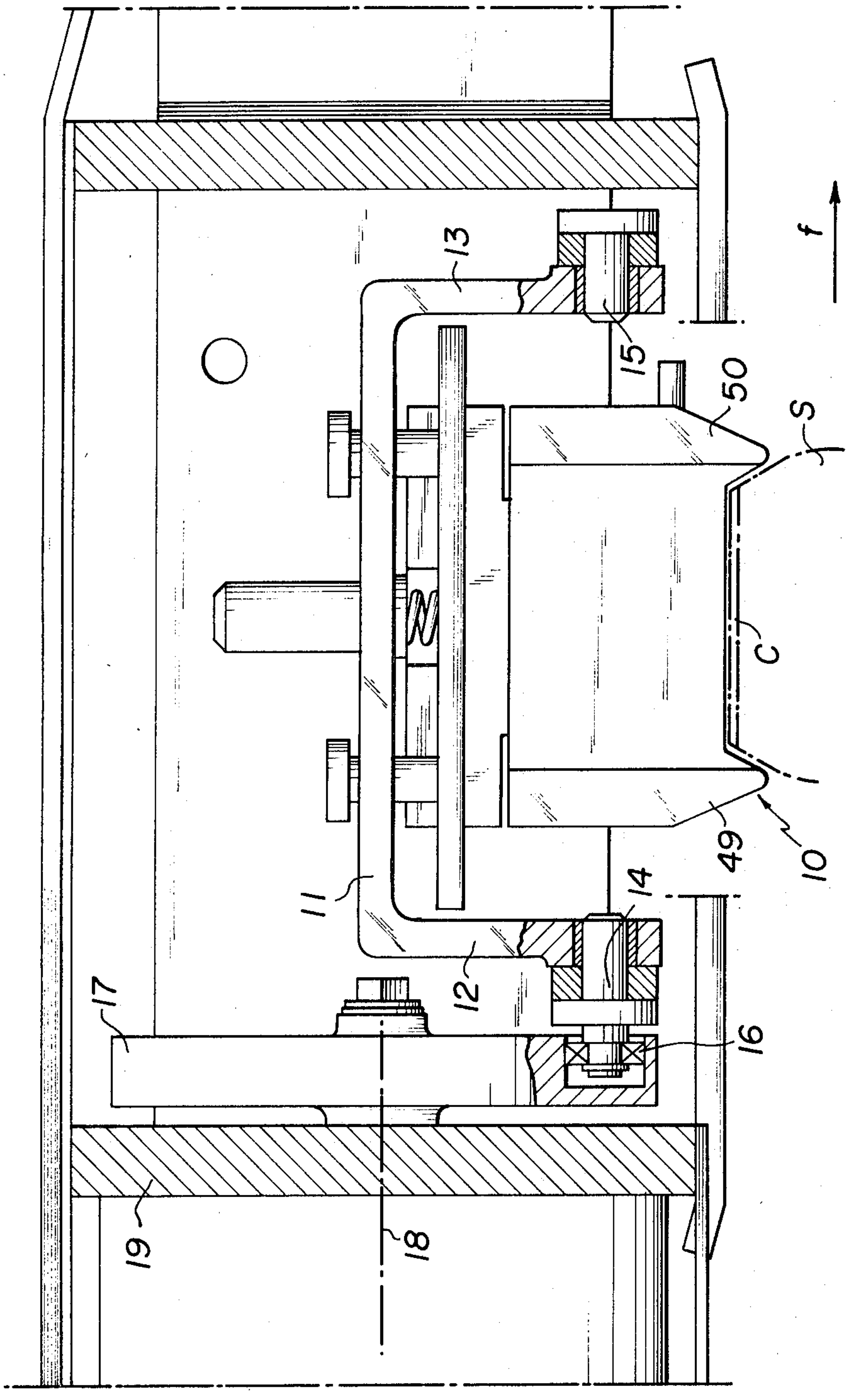
FIG. 1 is a top view in partial section of a device in accordance with the invention.

The apparatus in accordance with the invention is suitable for reading information contained on an information carrying means such as a perforated card or the like. The apparatus comprises a reading head 10 articulatory mounted on a U-shaped member 11 having arms 12 and 13. Pivot pins 14 and 15 are rotatably received in openings traversing portions of arms 12 and 13 which openings are adjacent the free edges of arms 12 and 13. Pivot pin 14 is capable of rotational movement via a roller 16. Roller 16 is received in an opening in a cam 17, which cam 17 can rotate about an axis 18 extending longitudinally of the frame work 19 for the apparatus. Such rotation can be effected by any suitable means (not shown).

Figure 4:
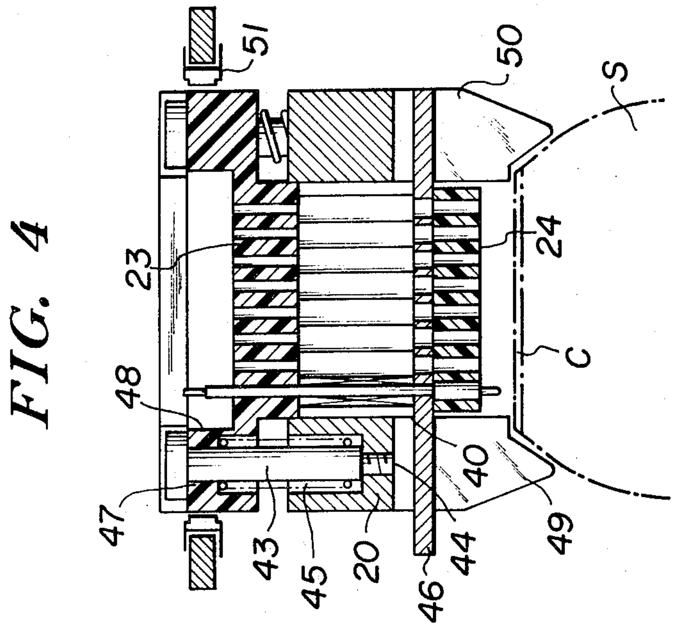
FIG. 4 is a sectional view taken along the line 4—4 of FIG. 2.

The reading head 10 includes a suppporting frame 20 (FIG. 4) which is connected to a casing 21. The casing 21 is formed from an insulating material and is capable of relative vertical movement with respect to frame 20. The casing 21 comprises a cup-shaped member 22 having a base 23 and a cover 24 fixedly fastened to the cup-shaped member 22 by means of screws such as are shown at 25. Between the cup-shaped member 22 and the cover 24, there is disposed a board 26 carrying on the face 27 thereof facing base 23, the conductive parts of a printed circuit. The conductive parts of the printed circuit constitute the fixed contacts of interruptors.

Figure 5:
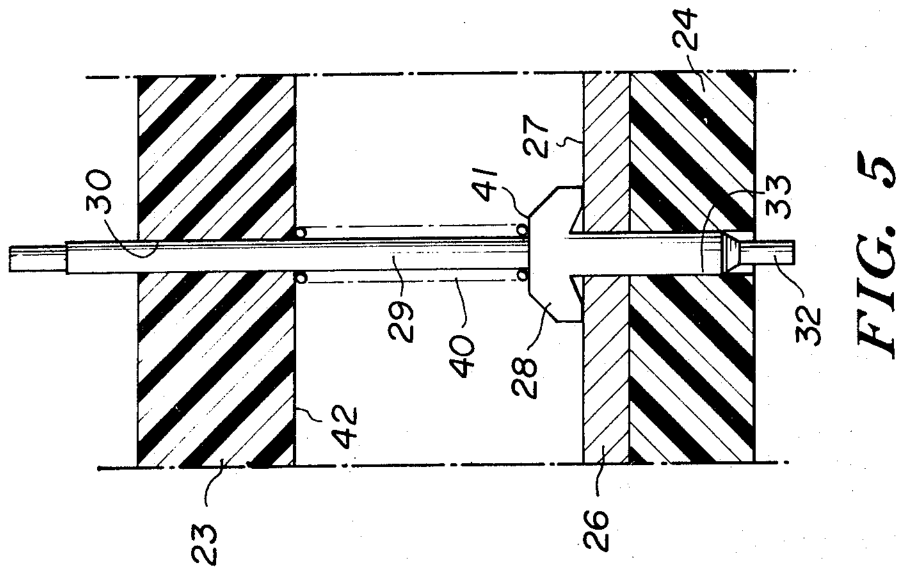
FIG. 5 is a detailed view of on a larger scale of a part of the reading head of the apparatus in accordance with the invention.

Mounted on casing 21 is a plurality of spring biased contact members or rods 29. Formed on rods 29 are contact heads 28. Contact heads 28 constitute the movable contacts of the interruptors (FIG. 5). Rods 29 traverse the casing 21 through passages 30 formed in the base 23 of the cup-shaped member 22 and through passages 33 formed in the cover 24.

Figure 3:
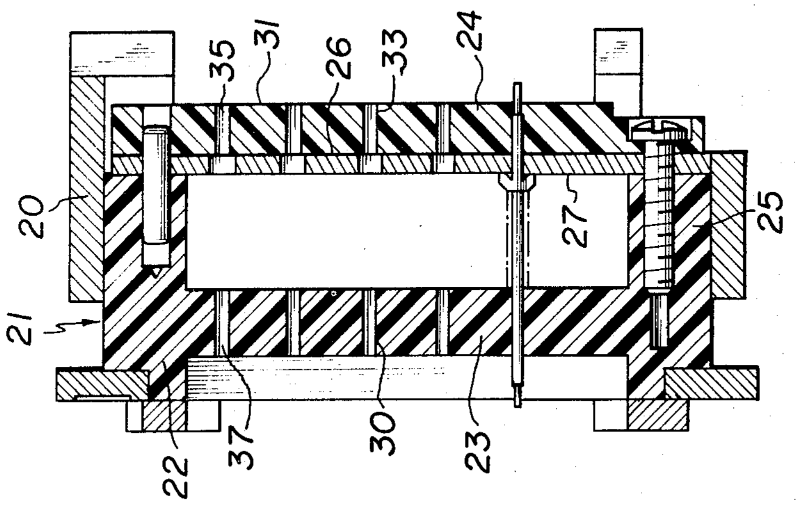
FIG. 3 is a view in section along the line 3—3 of FIG.2.
Figure 2:
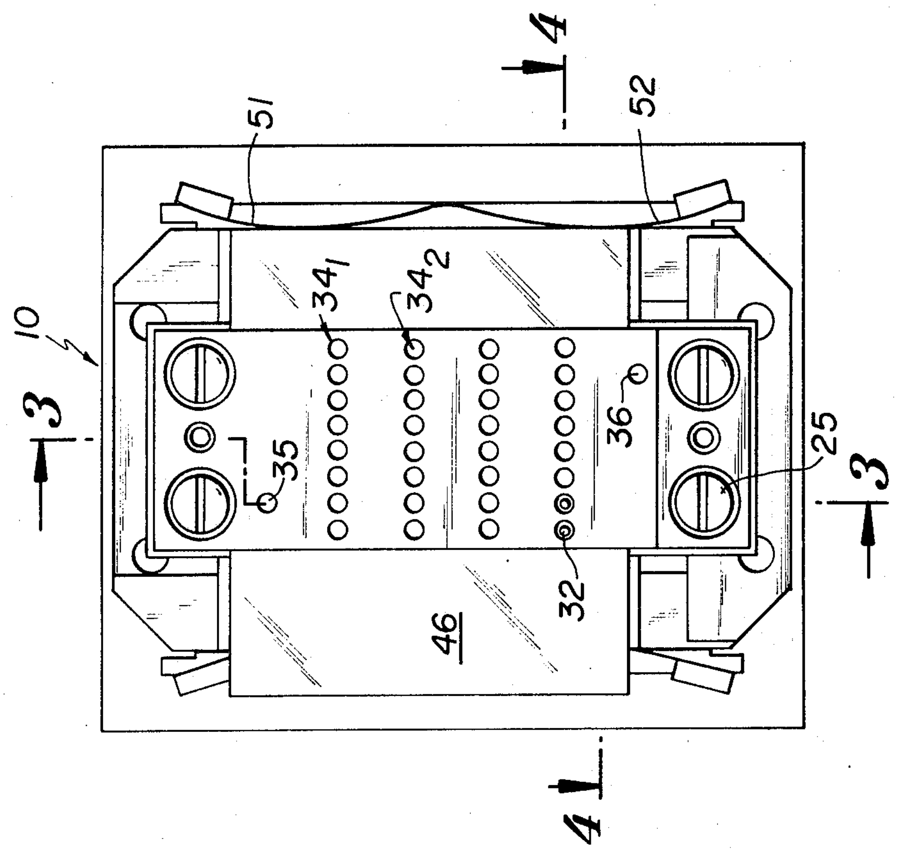
FIG. 2 is a front elevation view of the reading head of such a device, certain parts having been removed for clarity sake.

Each rod 29 includes at one extremity a portion (finger 32) which extends through the passage 33 and at the other extremity, a portion which extends through passage 30. A biasing member 40 (FIGS. 4 and 5), preferably a coil spring, surrounds each rod 29. Each biasing member 40 bears at one of its ends on the surface of floor 23 facing the board 26. The other end of the biasing member 40 bears upon the non-contacting portion 41 of the head 28. The passageway formed by aligned passages 30 and 33 of casing 21 is patterned, for example, in the manner shown in FIG. 2, that is to say, in rows $34_1$, $34_2$ etc. The distribution of the passageways corresponds to the distribution of the perforatable sites on card C the information carrying means). Cover 24 has formed in the area of its two diametrically opposite corners, passageways 35 and 36 aligned with corresponding passageways 37, formed in the base 23 of the cup-shaped member 22 as shown in FIGS. 2 and 3.

The assemblage comprising the casing 21, rods 29 which includes the movable contacts and the printed circuit board 26, is mounted on the frame 20 by small column-shaped members 43 having a threaded portion 44 at one extremity. The portion 44 is screwed into the frame 20. Around columns 43 are placed springs 45. Springs 45 sit in aligned grooves formed in the frame 20 and the base 23 of the cup-shaped member 22.

When the apparatus of the invention is being displaced in the direction of the arrow f as shown in FIG. 1, a support S carrying a perforated card C arises alongside the apparatus. Programming means, not shown, conduct the reading head 10 into contact with the support S against the action of springs 45 until the exterior face 31 of the cover 24 bears against the perforated card C, the information contained on which is to be read.

Two lateral projections 49 and 50 (FIGS. 1 and 4) positioned on the reading head 10 contribute to the centering of the reading head 10 relative to the support S. Biasing means, advantageously two leaf springs, as are shown at 51 and 52 in FIG. 2, maintain the reading head 10 in the position whereat it can read the information contained on the card while permitting a slight lateral clearance of support S relative to the reading head. In a preferred embodiment, such a clearance is of the order ± 5 mm.

Fingers 32 positioned in passages 35–37 and 36–37 assure that a staisfactory contact is effected between the card C and the face 31. Such fingers are advantageously shorter than the other fingers 32 which serve for reading perforations.

When the contact between face 31 and card C has effectively taken place, certain of the fingers 32 penetrate the perforations formed in the card C. These perforations represent the information entered on the card C. Those fingers which are opposite to parts of said card C, which have not been perforated, move upwardly against the biasing action of spring 40. When the fingers 32 are thus moved upwardly (and heads 28 no longer are in engagement with the board) there is opened spacial disposition contacts such that they command, (for example, by a diode matrix) an identification logic device connected to the part 46 of the board 26, external to the casing 21 which carries the terminals of an electrical connection to the said logic device.

Card C having been read, the reading head 10 is placed in its starting position by a programming means (not shown). Springs 40 bias those of the fingers 32 which were moved upwardly in the course of reading said card C into a position whereat they are brought into contact with the fixed contacts on board 26 to await the arrival of a new card C for analyzing the information contained thereon.

While the information carrying means has been described as containing perforatable sites, it is, of course, to be understood that information carrying means may be so constructed as to have depressible sites thereon, rather than perforatable sites. Such depressions can be so sized to receive the ends of the fingers 32 on rod 29.

Also, it should be further understood that an information carrying means which is capable of being embossed, e.g. an embossable card may also be efficaciously used. In this embodiment, appropriate arrangements in the logic device are made so that it may analyze the information conveyed by the movement of the moveable contacts of the interruptors in response to engagement of the fingers thereon with the embossments on the information carrying means.

We claim:

1. An apparatus for reading information contained on an information carrying means comprising a casing member formed of an insulating material, a plurality of contact members movably mounted on the casing member, one end of each of said contact members extending from the casing member and being so sized as to permit the entry thereof into perforations formable on the information carrying means at perforatable sites, said contact members being disposed on the casing member in a pattern corresponding to the pattern of the perforatable sites on the information carrying means, said contact members each including a contact portion at a site remove from said one end; a circuit board fixedly secured to the casing member, each of said contact portions being the movable portion of an interruptor, the fixed contact of which being carried by the printed circuit board said casing member being mounted slidably on a base member and biasing means disposed between the casing member and the base member.

2. An apparatus in accordance with claim 1 in which the base member comprises lateral projections extending outwardly thereof in substantial parallel planes and said information carrying means being slidably receivable between the lateral projections.

3. An apparatus in accordance with claim 2 in which an elastic means biasingly bears against the base member whereby when the information carrying means are slidably received between the lateral projections, relative lateral movement of the base member to the information carrying means is permitted.

4. An apparatus in accordance with claim 3 in which the casing member comprises a body member and a cover therefor, the printed circuit board being fixedly secured to the internal face of the cover and biasing means associated with the contact members for biasing such contact members in a direction outwardly of the cover.

5. An apparatus in accordance with claim 4 in which the said biasing means are disposed between the floor of the body member facing the cover and the non-contacting surfaces of the contact portions.

6. An apparatus in accordance with claim 5, comprising at least one additional auxiliary finger member movably mounted on the casing member, said at least one auxiliary finger member being adapted to assure alignment between the casing member and the information carrying means.

7. An apparatus for reading information contained on an information carrying means comprising a casing member formed of an insulating material, a plurality of contact members movably mounted on the casing member, one end of each of said contact members extending from the casing member, said one end of each of said contact members being adapted to be moved in response to the selective engagement thereof with the information carrying means, said contact members being disposed on the casing member in a pattern corresponding to the sites on the information carrying means which can be adapted to contain information, said contact members each including a contact portion at a site remote from said one end, a circuit board fixedly secured to the casing member, each of said contact portions being the movable portion of an interruptor, the fixed contact of which being carried by the printed circuit board said casing member being mounted slidably on a base member and biasing means disposed between the casing member and the base member.

8. An apparatus in accordance with claim 7 in which the base member comprises lateral projections extending outwardly thereof in substantial parallel planes and said information carrying means being slidably receivable between the lateral projections.

9. An apparatus in accordance with claim 8 in which an elastic means biasingly bears against the base member whereby when the information carrying means are slidably received between the lateral projections, relative lateral movement of the base member to the information carrying means is permitted.

10. An apparatus in accordance with claim 9 in which the casing member comprises a body member and a cover therefor, the printed circuit board being fixedly secured to the internal face of the cover and biasing means associated with the contact members for biasing such contact members in a direction outwardly of the cover.

11. An apparatus in accordance with claim 10 in which the said biasing means are disposed between the floor of the body member facing the cover and the non-contacting surfaces of the contact portions.

12. An apparatus in accordance with claim 11, comprising at least one additional auxiliary finger member movably mounted on the casing member, said at least one auxiliary finger member being adapted to assure alignment between the casing member and the information carrying means.

* * * * *

PO-1050
(5/69)

UNITED STATES PATENT OFFICE
CERTIFICATE OF CORRECTION

Patent No. 3,751,641 Dated August 7, 1973

Inventor(s) Pierre Durand and Gerard Lartigue

It is certified that error appears in the above-identified patent and that said Letters Patent are hereby corrected as shown below:

Title page - Inventors: "Lartique" should be

Lartigue

Priority Deleted: Add

Foreign Application Priority Data

Jan. 12, 1971 France 71.00747

References Cited: "Young 234/61.11C" should be

Young 235/61.11C

"McEwan 234/61.11C" should be

McEwan 235/61.11C

Signed and sealed this 17th day of September 1974.

(SEAL)
Attest:

McCOY M. GIBSON JR.
Attesting Officer

C. MARSHALL DANN
Commissioner of Patents